US011865804B2

(12) United States Patent
Carstens et al.

(10) Patent No.: US 11,865,804 B2
(45) Date of Patent: Jan. 9, 2024

(54) OUTLET DEVICE FOR PRESSED ARTICLES OF A ROTARY TABLET PRESS AND ROTARY TABLET PRESS WITH OUTLET DEVICE

(71) Applicant: Romaco Kilian GmbH, Cologne (DE)

(72) Inventors: Jens Carstens, Leverkusen (DE); Uwe Zietmann, Cologne (DE)

(73) Assignee: Romaco Kilian GmbH, Cologne (DE)

( * ) Notice: Subject to any disclaimer, the term of this patent is extended or adjusted under 35 U.S.C. 154(b) by 945 days.

(21) Appl. No.: 16/610,269

(22) PCT Filed: May 3, 2018

(86) PCT No.: PCT/IB2018/053081
§ 371 (c)(1),
(2) Date: Nov. 1, 2019

(87) PCT Pub. No.: WO2018/203276
PCT Pub. Date: Nov. 8, 2018

(65) Prior Publication Data
US 2021/0129475 A1 May 6, 2021

(30) Foreign Application Priority Data
May 3, 2017 (DE) .................... 20 2017 102 645.0

(51) Int. Cl.
*B30B 15/32* (2006.01)
*B30B 11/08* (2006.01)
(Continued)

(52) U.S. Cl.
CPC .............. *B30B 15/32* (2013.01); *B29C 33/44* (2013.01); *B29C 37/0003* (2013.01);
(Continued)

(58) Field of Classification Search
CPC .......... B30B 11/08; B30B 15/32; B29C 43/08
See application file for complete search history.

(56) References Cited

U.S. PATENT DOCUMENTS 2,756,697 A * 7/1956 Brook ...................... B30B 11/12
425/168
3,744,582 A * 7/1973 Withnell ................... G01G 3/16
177/60
(Continued)

FOREIGN PATENT DOCUMENTS

DE 102007060335 A1 6/2009
DE 202013103361 U1 12/2014
(Continued)

OTHER PUBLICATIONS

International Preliminary Report on Patentability for corresponding PCT/IB2018/053081 dated Nov. 5, 2019, 7 pgs.
(Continued)

*Primary Examiner* — Galen H Hauth
(74) *Attorney, Agent, or Firm* — Rankin, Hill & Clark LLP (57) ABSTRACT

A rotary tablet press with a rotor having a die plate with die bores for producing pressed articles, and with a deflector device for deflecting the pressed articles, which are produced in the die bores and located on the upper face of the die plate in the production process, to an outlet device for the pressed articles, the outlet device includes a conveyor belt for taking over and transporting the pressed articles deflected by the deflector device, wherein the conveying speed of the conveyor belt being adjustable according to the speed of the rotor and/or being adjusted by means of the control device according to the speed of the rotor.

19 Claims, 4 Drawing Sheets

(51) Int. Cl.
  *B30B 15/00* (2006.01)
  *B29C 33/44* (2006.01)
  *B29C 37/00* (2006.01)
  *B29C 43/04* (2006.01)

(52) U.S. Cl.
  CPC ...... *B29C 37/0007* (2013.01); *B29C 37/0017* (2013.01); *B29C 43/04* (2013.01); *B30B 11/08* (2013.01); *B30B 15/0082* (2013.01)

(56) References Cited

U.S. PATENT DOCUMENTS

| | | | |
|---|---|---|---|
| 3,779,685 A * | 12/1973 | Pisoni | B30B 11/08 425/341 |
| 6,316,026 B1 | 11/2001 | Tatara et al. | |
| 6,481,565 B1 * | 11/2002 | Sherwood | B65G 21/2036 198/689.1 |
| 2001/0017025 A1 | 8/2001 | Amborn et al. | |
| 2007/0184143 A1 | 8/2007 | Ferrini et al. | |
| 2009/0026373 A1 | 1/2009 | Mertens et al. | |
| 2010/0094449 A1 | 4/2010 | Boeckx et al. | |
| 2012/0135100 A1 | 5/2012 | Uneme | |
| 2015/0125242 A1 | 5/2015 | Schmett et al. | |
| 2017/0080662 A1 | 3/2017 | Carstens et al. | |
| 2017/0087789 A1 | 3/2017 | Ingo et al. | |

FOREIGN PATENT DOCUMENTS

| | | | | |
|---|---|---|---|---|
| GB | 640440 A | * | 7/1950 | ............ B30B 11/00 |
| JP | H026100 A | | 1/1990 | |
| JP | 2012006058 A | | 1/2012 | |
| KR | 20130128090 A | | 11/2013 | |

OTHER PUBLICATIONS

Espacenet bibliographic data: JP 2012006058 (A), Published Jan. 12, 2012, 1 pg.
Espacenet bibliographic data: KR 20130128090 (A), Published Nov. 26, 2013, 1 pg.
International Search Report for corresponding PCT/IB2018/053081 dated Sep. 6, 2018, 12 pgs.
Espacenet Bibliographic data:DE 202013103361 (U1), Published Dec. 4, 2014, 2 pgs.
Espacenet Bibliographic data:JP H026100 (A), Published Jan. 10, 1990, 1 pg.
Espacenet Bibliographic data:DE 102007060335 (A1), Published Jun. 18, 2009, 1 pg.

* cited by examiner

OUTLET DEVICE FOR PRESSED ARTICLES OF A ROTARY TABLET PRESS AND ROTARY TABLET PRESS WITH OUTLET DEVICE

This Application claims priority in International Application No. PCT/IB2018/053081 that was filed on May 3, 2018, which claims priority in DE No. 20 2017 102 645.0 that was filed on May 3, 2017, both of which are incorporated by reference into this application.

The invention relates to an outlet device for pressed articles which are produced on a rotary tablet press with a rotor, which is able to be driven in a rotational manner, having a die plate, and with a deflector device for deflecting the pressed articles. The invention further relates to a rotary tablet press comprising a rotor with a die plate with die bores for producing pressed articles by means of press punch pairs in the die bores, and which is able to be driven in a rotational manner, comprising a deflector device for deflecting the pressed articles, which are produced in the die bores and located on the upper face of the die plate in the production process, to an outlet device for the pressed articles, and comprising a control device for controlling the rotational speed of the rotor.

BACKGROUND OF THE INVENTION

In rotary tablet presses with a plurality of punch pairs it is now possible to achieve exceptionally high production outputs of pressed articles with more than 1.5 million pressed articles per hour. The production process in almost all tablet presses is carried out such that the lower punch of a punch pair is driven downwardly during the rotation of the rotor in order to produce a cavity in the die openings of the die plate, said cavity being filled in a filling unit, for example with powder or granulate to the desired quantity, wherein subsequently the upper and the lower punch of the punch pair are pressed together in a controlled manner in a pressing station before both punches are lifted by means of the control cams controlling the movement thereof in order to move the pressed article thus produced to the upper face of the die plate. Subsequently, via the rotation of the rotor, the pressed article is deflected by means of a deflector device and supplied to an outlet device in order to supply the pressed article to further processing stations, for example for deburring, sorting and packing. The production output in this case depends on numerous factors, such as for example the size of the pressed articles and the number of punch pairs. In rotary tablet presses, pressed articles may be produced for very different industrial sectors and uses, such as for example detergent tablets for the detergent industry, stock cubes for the food industry, effervescent tablets for the drinks industry or pharmaceutical tablets for the pharmaceutical industry.

Generally, the outlet device consists of a chute plate comprising a plurality of outlet channels and extending obliquely to the surface of the die plate, said chute plate being provided with one or more deflectors in order to eject faulty pressed articles or sample pressed articles and to guide the tablet stream of all good tablets having no production errors to the production stations arranged downstream. By way of example, reference is made to DE 10 2011 050 290 A1 which discloses a conventional tablet outlet with a chute and an additional weighing device. DE 10 2007 060 335 A1 discloses a further exemplary embodiment of a tablet outlet which is additionally provided with a cleaning device.

In the processing stations arranged downstream it is usual to carry out the further transport of the tablets by means of conveyor belts, the previously unordered and collected tablets generally having to be separated therefor by means of individual separating devices and also having to be aligned in the case of unsymmetrical pressed articles. During the production of core tablets with a separate core deposited during the production process into an already partially filled die opening, it is known to supply the tablet cores via rotary plates and conveyor belts to an insertion device for the table cores (DE 20 2013 103 361 U1).

In the generic tablet outlets with a chute plate the pressed articles enter the outlet channels at a high speed according to the rotational speed of the rotor. The larger the tablet format and thus the weight of the pressed articles, the greater the risk of damage to the pressed articles in the tablet outlet which is why with large-format pressed articles, with diameters or lengths for example of more than 15 mm, a significantly reduced rotational speed and thus the speed of the rotor has to be set.

SUMMARY OF THE INVENTION

It is the object of the invention to provide a rotary tablet press and an outlet device for the pressed articles produced on the rotary tablet press which, even in the case of large-format pressed articles with, for example, a diameter or edge length of more than 15 mm, a high production output is possible with minimal risk of damage.

To achieve this object, it is proposed for the outlet device that the outlet device comprises a conveyor belt for taking over and transporting the pressed articles deflected by the deflector device, the conveying speed of the conveyor belt being able to be set or adjusted according to the speed of the rotor. For a rotary tablet press it is proposed that the outlet device comprises a conveyor belt for taking over and transporting the pressed articles deflected by the deflector device, the conveying speed of the conveyor belt being adjustable according to the speed of the rotor and/or being set by means of the control device according to the speed of the rotor. It has been surprisingly found that the production output, in particular during the production of large-format pressed articles on a rotary tablet press, may be increased when, instead of a conventional tablet outlet provided with a chute, an outlet device with a conveyor belt is used and the conveying speed of the conveyor belt is adapted to the production speed and/or the speed of the die plate. By transferring the pressed articles onto a conveyor belt, it is possible to remove the pressed articles in a manner which is considerably more gentle and which eliminates damage to the pressed articles, as frequently occurs in conventional tablet outlets, and already has the advantage that a subsequent ejection of damaged pressed articles is avoided. The use of a conveyor belt already in the outlet device directly adjacent to the rotary tablet press has the further advantage that it is possible to couple all downstream processing stations to the production speed of the rotary tablet press, since an adaptation to the production speed and a control of the quantity of pressed articles discharged from the outlet device already takes place in the outlet device. As a result, therefore, it has been surprisingly shown that the production speed may be increased overall.

According to a particularly advantageous embodiment of a rotary tablet press, the deflector device comprises a deflector rail with a guide wall for the pressed articles, wherein the guide wall of the deflector rail partially protrudes radially over the circumference of the die plate. When using a conveyor belt in the outlet device, it is particularly advantageous if the movement of the pressed articles is initially delayed in the region of the deflector rail, so that the pressed articles may be pushed out on both sides due to the rotation of the die plate and the subsequently supplied pressed articles may be pushed out radially outwardly from the operating area of the die plate and/or the deflector device and namely preferably as parallel as possible to the running direction of the conveyor belt, which may be easily achieved by a suitably adapted curvature of the guide wall of the deflector rail and a lengthening of the guide wall relative to conventional deflector rails.

It is particularly advantageous in an outlet device or rotary tablet press according to the invention if the conveying speed of the conveyor belt is more rapid than the production speed of the pressed articles, which is dependent on the rotational speed of the rotor, and namely preferably always by a fixed factor. By this measure, in particular, it may be achieved that between two successive pressed articles on the conveyor belt a spacing is always formed and preferably a uniform spacing between adjacent pressed articles, irrespective of the production speed. This spacing of the pressed articles already in the outlet device prevents further long-term damage to the pressed articles by mutual contact and at the same time simplifies the further processing, not only on the subsequent downstream processing stations but also already in the outlet device.

According to the particularly preferred embodiment, the outlet device for the conveyor belt comprises at least one front deflection roller and one rear deflection roller, wherein the front deflection roller in the operative position of the outlet device is able to be positioned adjacent to the circumference of the die plate and preferably is able to be positioned or is positioned such that in the operative position it protrudes at least partially below a guide wall of a deflector rail of the deflector device partially radially protruding over the die plate.

It is also advantageous when a guide top rail is arranged at a distance above the conveying section of the conveyor belt, said guide rail preferably extending at least partially above the front deflection roller and/or having an inlet chamfer on its lower face.

In order to improve the transfer of the pressed articles from the deflector device onto the conveyor belt, the upper conveying section of the conveyor belt on the front deflection roller preferably extends lower relative to the upper face of the die plate and/or a fall protection plate is mounted on the outlet device, said fall protection plate extending at least partially in the gap between the front deflection roller and the circumference of the die plate and extending lower relative to the upper face of the die plate, wherein preferably the fall protection plate on the front face facing the circumference of the die plate has a front edge extending in an oblique or curved manner. The fall protection plate in the present case is only functional during the start-up of a rotary tablet press since during start-up, in particular in the case of the first pressed articles, an exceptionally low transfer speed is present between the pressed articles and the outlet device and, therefore, these pressed articles have to be prevented from falling into an open gap between the circumferential wall of the die plate and the deflection roller and could provide blockages or operational interruptions there. The operation of the fall protection plate would be ensured if it were located at the same height as the upper face of the die plate but, in order to avoid positional errors or steps in the movement path, it is advantageous if it is positioned lower down.

Since during operation the pressed articles also leave the die plate and are pushed onto the conveyor belt at relatively high speed, it is particularly advantageous if the pressed articles are calmed on the conveyor belt substantially simultaneously to the transfer. A calming measure may be that the conveyor belt is provided with recesses for the through-passage of air and is preferably configured as a perforated belt and in that below the upper conveying section, preferably between the upper conveying section and the lower return section, a suction chamber which is able to be connected or is connected to a suction device is formed. The earlier, i.e. the nearer, the suction chamber is effective relative to the front deflection roller by means of the perforated belt, therefore a suction is exerted on the pressed articles and accordingly the pressed articles are pulled against the conveyor belt by an additional force in addition to the inherent weight force, the more reliable the further processing of the pressed articles in the outlet device. It is particularly expedient if suction chambers separated from one another are formed between the front deflection roller and the rear deflection roller for producing separate suction zones, wherein preferably the suction zone arranged closer to the front deflection roller is assigned an air blade, the air outlet direction thereof preferably being oriented obliquely and counter to the direction of conveyance of the conveyor belt, and/or wherein a tunnel portion for the conveying section of the conveyor belt is formed above each suction chamber by means of a cover. By means of the suction devices already a prior cleaning of the pressed articles, for example from dust, etc. may be achieved, wherein the cleaning action may be even further increased by the air blade. At the same time, the suction chambers, in particular in combination with the covers for producing tunnel portions, may minimize exposure to dust in the surrounding space and contamination of the operating personnel of the rotary tablet press.

In order to be able to set up the rotary tablet press when the outlet device is mounted, an adjustable deflector may be arranged between the front deflection roller and the rear deflection roller, wherein preferably a suction zone is not formed in the operative region of the deflector. By adjusting the deflector, in particular by pivoting the deflector about an axis extending at right angles to the conveyor belt, during the set-up process the pressed articles conveyed on the conveyor belt may be deflected to a lateral tablet outlet, which for example leads to a storage container for faulty pressed articles (reject tablets). In order to be able to withdraw sample pressed articles in the outlet device according to the invention, it is particularly advantageous if a separating device for sample pressed articles is arranged between the front deflection roller and the rear deflection roller, wherein preferably a blower unit with a compressed air nozzle is preferably arranged at the side adjacent to the conveying section, and an outlet channel for sample pressed articles, formed in particular by a chute plate, is arranged on the opposing side of the conveying section. Expediently a light barrier is arranged to this end between the deflector and the blower unit, wherein the blower unit is actuated by being coupled chronologically to a detection signal of the light barrier.

In order to improve the transfer of the pressed articles from the die plate to the conveyor belt, a guide plate may protrude on the front face over the conveyor belt, said guide plate in the operative position together with the deflector device forming a forced guidance for the pressed articles deflected on the deflector device.

In order to be able to eject faulty pressed articles in a rotary tablet press, which for example are ejected whilst still in the press with a separating device assigned to the deflector device, in particular a blower nozzle, an outlet channel for faulty pressed articles, preferably formed by an outlet chute, may extend at least partially parallel to the conveyor belt, wherein the outlet channel for faulty pressed articles preferably has an inlet opening, the guide plate being formed at the end thereof, viewed in the rotational direction of the die plate.

In order to simplify an adaptation of the conveyor belt and the outlet device to different installation positions and/or different rotary tablet presses, expediently the outlet device may be positioned on a frame and the height of the position of the conveyor belt is able to be set by adjustable feet of the frame and/or by a lifting device.

These and other objects, embodiments aspects, features and advantages of the invention will become apparent to those skilled in the art upon a reading of the Detailed Description of the invention set forth below taken together with the drawings which will be described in the next section.

BRIEF DESCRIPTION OF THE DRAWINGS

The invention may take physical form in certain parts and arrangement of parts, a preferred embodiment of which will be described in detail and illustrated in the accompanying drawings which form a part hereof and wherein.

DESCRIPTION OF PREFERRED EMBODIMENTS

Figure 1:
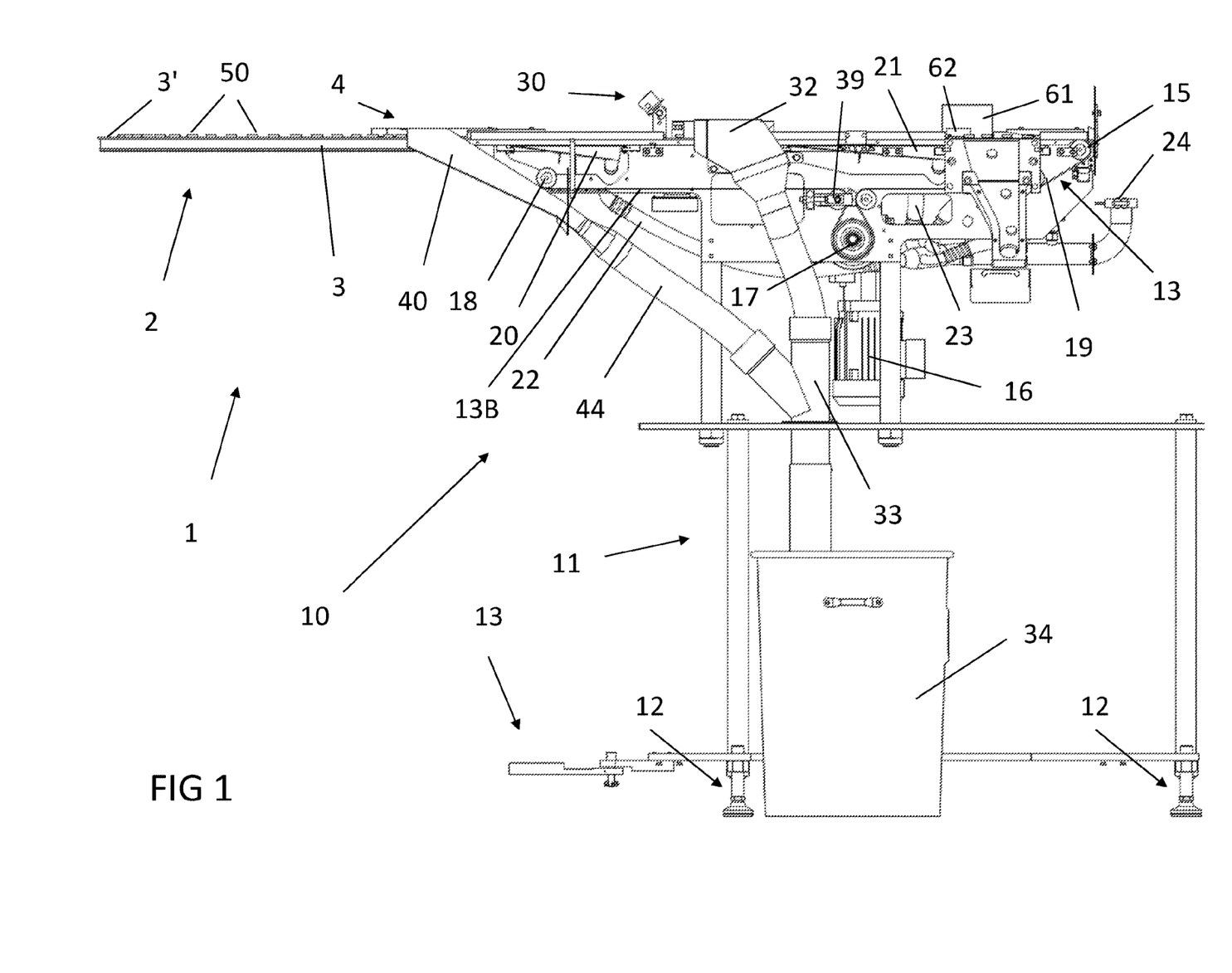
FIG. 1 shows schematically in a side view an outlet device according to the invention in the operating state on a die plate of a rotary tablet press.

Referring now to the drawings wherein the showings are for the purpose of illustrating preferred and alternative embodiments of the invention only and not for the purpose of limiting the same, in FIG. 1 a rotary tablet press according to the invention is denoted overall by the reference numeral 1 and an outlet device according to the invention on the rotary tablet press 1 is denoted by the reference numeral 10. In FIG. 1 as in the further figures, substantially only the die plate 2, as a main component of an otherwise not shown rotor 3, and a deflector device 4 are shown of the rotary tablet press. The housing of the rotary tablet press 1 is shown to the same limited extent as the press punch pair, the drives, the control cams or the other usual components of a rotary tablet press which in this case may have any known design, which is why reference is additionally made to the knowledge of the person skilled in the art for rotary tablet presses.

In the figures, pressed articles such as in particular large-format tablets with a diameter or an edge length of more than 15 mm are denoted by the reference numeral 50, said pressed articles by means of the press punch pair, not shown, being produced inside the die bores of the die plate in the known manner and then by lifting the lower punch of the respective press punch pair being lifted to the upper face 3' of the die plate 3, until they are deflected to the outlet device 10 for the pressed articles 50 by means of the deflector device comprising a passive stationary deflector rail 6, if a fault in the production of an individual pressed article is not identified by a process control unit and a separating process for a pressed article 50 has not been initiated before the pressed articles reach the outlet rail 6, due to the rotation of the die plate 3 in the rotational direction R, as will be described further below.

The outlet device 10 for the pressed articles 50 produced by means of the rotary tablet press 1 has a lower frame 11 which in the exemplary embodiment shown is provided with height-adjustable feet 12 and a spacing monitoring device 13. The components of the outlet device 10 provided for the transport of the pressed articles 50 are arranged on the lower frame 11, wherein the outlet device 10, deviating from conventional tablet outlets, is provided with an endless circulating conveyor belt 13 which, between a front deflection roller 14 to be identified only in FIG. 4 and a rear deflection roller 15 to be identified only in FIG. 1, forms a conveying section 13A, by which the pressed articles 50 are removed substantially horizontally from the die plate 3. The conveyor belt 13 forms at the same time a return section 13B between the rear deflection roller 15 and the front deflection roller 14, which due to a plurality of intermediate rollers 18, 19 spaced apart from the conveying section 13A returns substantially parallel thereto between the rear deflection roller 15 and the front deflection roller 14. On a partial section the return section 13B of the conveyor belt 13 is wound around a drive roller 17 which is driven and/or drivable by means of a motor 16 and the pretensioning of the conveyor belt 13 is set by a tensioning roller 39.

Figure 4:
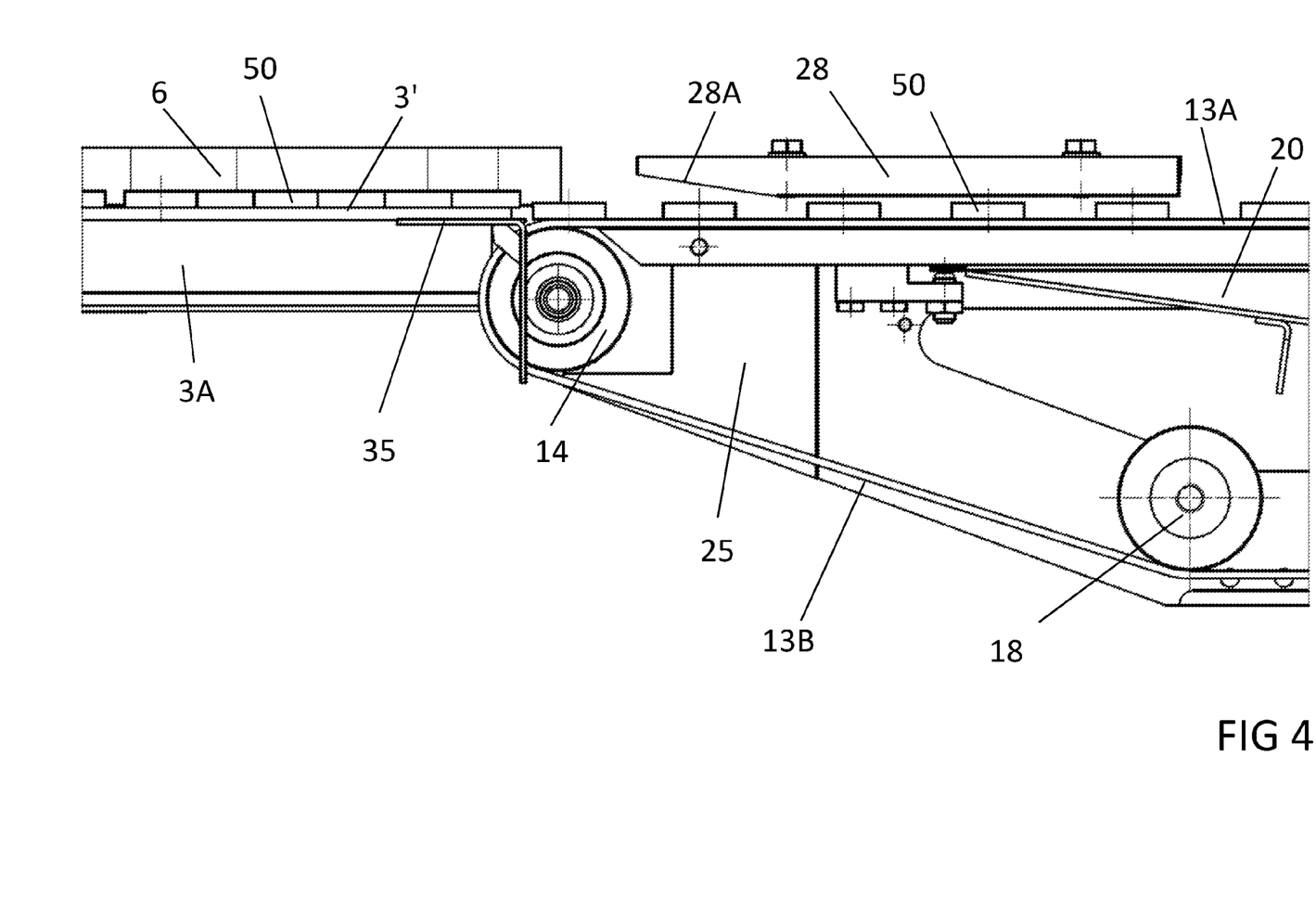
FIG. 4 shows a side view of the die plate and of the front portion of the outlet device according to the detailed view of FIG. 3.

As may be clearly identified in the figures, the conveyor belt 13 consists of a perforated belt with a plurality of through-holes through which air is able to pass. The holes of the perforated belt in this case cooperate with two suction chambers 20, 21 integrated in the outlet device 10, wherein the suction chamber 20 extends as close as possible to the front deflection roller 14. Both suction chambers 20, 21 are connected in this case to a central suction connector 24 via pipe lines 22, 23. FIGS. 1 and 4 enable it to be clearly identified that the suction chamber 20 and similarly the suction chamber 21 in each case only extends over a partial length of the conveying section 13A of the conveyor belt 13 and in this regard two suction zones which are separate from one another are formed. The suction chambers 20, 21 act exclusively from below on the portion of the conveying section 13A of the conveyor belt 13 located directly above the respective suction chamber but not on the return section or the other parts of the conveyor belt 13 circulating permanently during operation.

The conveying section 13A of the conveyor belt 13 circulates in the course of the production process at an adjustable speed and transports the pressed articles 50, deflected away from the die plate 3 by the deflector rail 6, in a linear manner and already spaced apart from one another to the rear face 37 of the outlet device 10 on which a transfer to a further processing station such as for example a metal detector, a deburring device or the like takes place. As may be clearly identified in FIG. 2 by way of example, all adjacent pressed articles 50 have a uniform spacing to one another on the conveyor belt 13, although in the operating region of the ejection rail 6 they are located one behind the other and are in contact with one another. The collection and accumulation of the pressed articles 50 in the region of the deflector rail 6 is achieved by a relatively large curvature of a guide wall 7 of the deflector rail 6 facing counter to the rotational direction R of the die plate 3. So that the pressed articles 50 in the operating region of the deflector rail 6 are collected in series, as is particularly clearly visible in FIG. 3, a guide plate 26 is arranged on a portion of the supporting structure of the outlet device 10 supporting the front deflection roller and protruding to the front, said guide plate protruding over the front deflection roller and thus the front deflection of the conveyor belt 13 and with a wall portion 27 extending approximately parallel to the guide wall 7 of the deflector rail 6, whereby a forced guidance of the individual pressed articles 50 accumulated there is formed. The guide plate 26 protrudes partially with a partial section of the wall portion 27 over the outer circumferential wall 3A of the die plate 3 inwardly and thus partially covers the upper face 3' of the die plate 3. The deflector rail 6 in turn protrudes with a partial section over the circumferential wall 3A of the die plate 3 radially outwardly and thus partially covers a partial section of the conveyor belt 13 in the region of the front deflection roller. The curvature of the guide wall 7 of the deflector rail 6 in the outlet region is aligned such that the pressed articles 50 leave the deflector rail 6 substantially parallel to the running direction of the conveyor belt 13. As may be identified further from FIG. 3, a horizontally oriented guide top rail 28 is positioned at a distance above the conveyor belt 13 by which pressed articles entering the start region of the conveyor belt 13 are optionally forced downwardly in the direction of the conveyor belt 13. In the inlet region, the guide top rail may be provided on the lower face with an oblique portion 28A (FIG. 4) in order to force the pressed articles downwardly in an improved manner. By lateral guide rails 29, 38, a uniform alignment of the individual pressed articles 50 on the conveyor belt 13 to one another may also be achieved transversely to the direction of conveyance of the conveying section 13A of the conveyor belt 13.

Due to the relatively high rotational speed of the rotor 2 and therefore of the die plate 3, in spite of the accumulation of a plurality of pressed articles in the region of the deflector rail 6 of the deflector device 4, the pressed articles 50 leave the operating region of the deflector rail 6 and the guide plate 26 at a high initial speed and only after a few centimeters of the running length of the conveying section 13A of the conveyor belt 13 do the pressed articles 50 adopt the speed of the conveyor belt, wherein the suction action of the front suction chamber 20, which becomes effective after a short initial length, assists this process. The suction action of the respective suction chambers 20, 21 may be increased by covers, not shown, which in the closed state produce a tunnel in the extension region of the suction chambers and thus not only ensure a greater suction pressure but at the same time improve the suction of dust, granulate or uncompressed initial material for the pressed articles which is carried along with the pressed articles. The removal of dust and initial material may be improved by an air blade 30 arranged at a distance above the conveyor belt 13 indicated schematically in FIGS. 1 and 2, the air slot thereof preferably extending obliquely oriented to the front and thus at the same time preventing the exit of dust from the front tunnel produced above the front suction chamber 20 by means of a cover.

Figure 2:
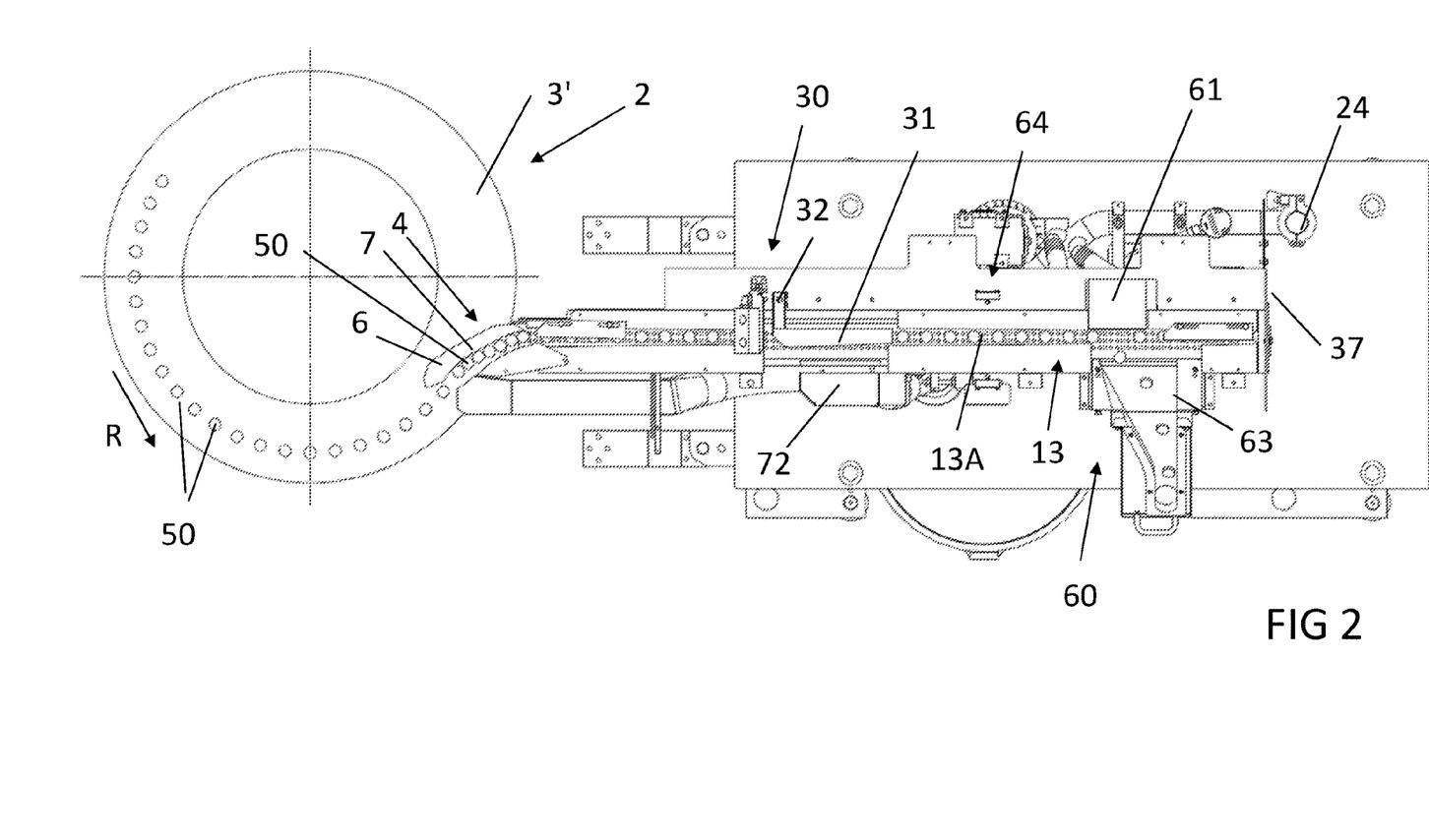
FIG. 2 shows schematically a plan view of the outlet device and the die plate according to FIG. 1.

The arrangement of two separate suction chambers 20, 21 along the running length of the conveying section 13A of the conveyor belt 13 further permits, in the exemplary embodiment shown, a deflector 31 to be able to be arranged approximately centrally in the outlet device 10, said deflector having no function in the operative position of the outlet device 10 shown in FIG. 2 but, during a set-up process of the rotary tablet press, being able to be pivoted about an axis 32 extending at right angles to the plane of the conveying section 13A in order to deflect all pressed articles transported by the conveyor belt 13 of the outlet device 10 to a chute 72 which is arranged to the side of the conveyor belt 13 and which leads via a tube 33 into a collection container 34 for faulty pressed articles. Since the suction chambers 20, 21 are not effective in the region of the deflector 31, the suction may be switched on even before the start of the set-up process, without influencing the deflection of the pressed articles located on the conveying section 13A by means of the deflector 31.

Figure 3:
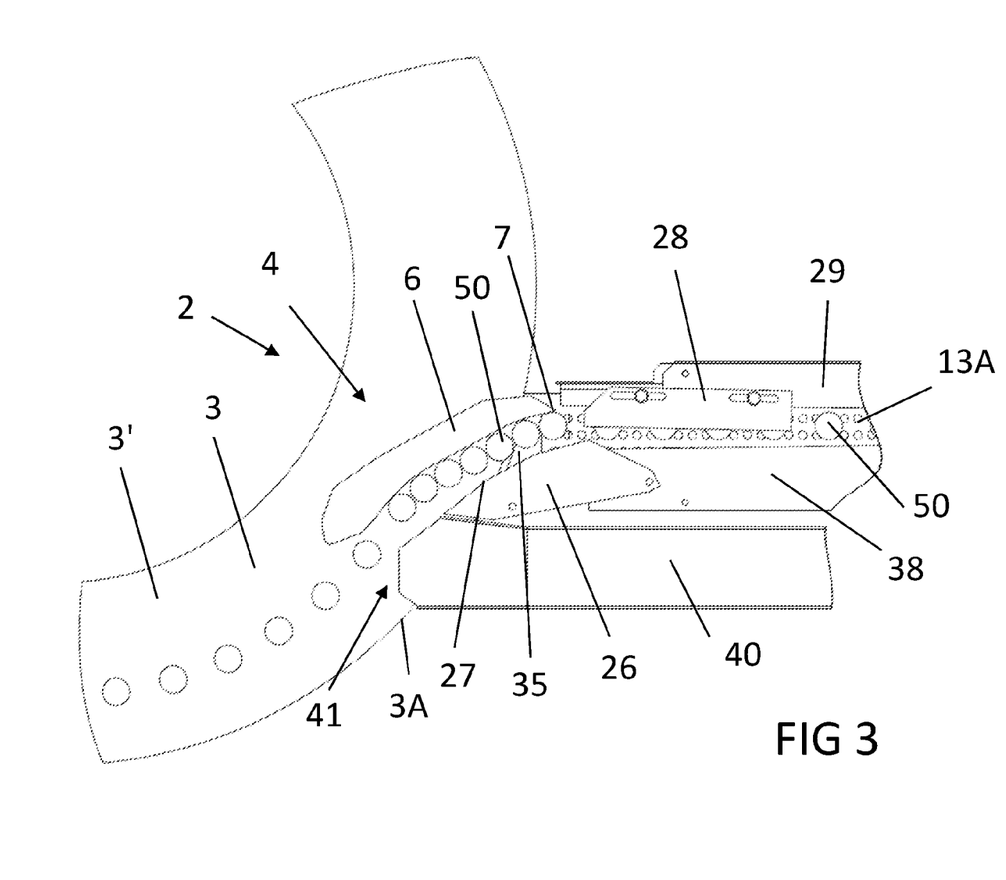
FIG. 3 shows a detailed view of the die plate and the front portion of the outlet device according to FIG. 2.

As may be identified further in FIGS. 1 to 3, the outlet device 10 is also provided with an outlet channel 40 for faulty pressed articles which may be discharged, due to a fault signal, while still in the rotary tablet press 1 in the course of the production process, for example from the pressing station by means of a separating device not shown, such as for example a blowing nozzle, in the region of the deflector device 4. The inlet opening 41 of the outlet channel 40, viewed in the rotational direction, is located upstream of the guide plate 26 and the outlet channel 40 in a manner known per se may consist of a chute or the like, which opens via a further tube 44 into the collection container 34. In the exemplary embodiment shown the outlet channel 40 extends at least partially approximately parallel to the conveyor belt 13 but is oriented obliquely downwardly.

The outlet device 10 comprising a conveyor belt 13 according to the invention is also provided in the exemplary embodiment shown with a sample withdrawal unit 60. By means of the sample withdrawal unit 60 in this case sample pressed articles may be discharged from the pressed articles 50 transported by means of the conveyor belt 13. The sample withdrawal unit 60 is located between the rear suction chamber 21 and the rear deflection roller 15 for the conveyor belt. The sample withdrawal unit 60 comprises a blower unit 61 arranged on the one side of the conveyor belt with a blower nozzle 62 aligned transversely to the running direction of the conveyor belt 13. On the side of the conveyor belt 13 opposing the blower unit 61, no lateral guides are present but instead a chute 63 is provided, in the operative region thereof individual pressed articles being able to be moved by means of a pulse of air pressure produced by the blower unit. So that a specific pressed article is specifically detected in an accurate manner, a light barrier 64 is arranged at a distance from the blower unit 61, by which the current position of a front region of a pressed article to be ejected in the sample withdrawal unit is detected. Since the light barrier 64 is at a fixed distance from the outlet unit 61, by means of the process control unit or a control unit for the outlet device 10 the time may be calculated when a control signal for the blower unit 61 has to be emitted in order to move the pressed article specifically detected by the light barrier 64 into the chute 63 by means of a pulse of air pressure.

From the above description it is already obvious that for an optimal mode of operation of the outlet device a separate transport of each pressed article on the conveyor belt is desired. This is achieved by the running speed of the conveyor belt 13 and thus the conveying speed being set according to the rotational speed of the rotor 2 of the rotary tablet press, thus according to the speed of the rotor 2, and in particular being regulated such that irrespective of optionally occurring alterations to the production speed a substantially uniform distance is produced between adjacent pressed articles. Preferably the control device, not shown, for the rotary tablet press is used to this end, in which generally not only a monitoring of the pressing process but also an adjustment and regulation of the rotational speed of the rotor takes place. Preferably, the conveyor belt 13 for the separate transport of the pressed articles runs more rapidly than the production speed of the rotary tablet press by a specific factor and thus also than the initial speed of the individual pressed articles when transferred from the die plate 3 onto the conveyor belt 13.

During the start-up of the rotary tablet press, in order to avoid problems due to a speed of the pressed articles which is too low, a fall protection plate 35 may be additionally provided in the vicinity of the front deflection roller 14, visible in particular in FIG. 4, which covers an opening (gap) between the front face of the conveyor belt 13 deflected on the front deflection roller 14 and the circumferential wall 3A of the die plate 3 and optionally has a front edge extending in an oblique or curved manner which faces the circumferential wall 3A of the die plate 3, in order to cover the gap as effectively as possible. FIG. 4 also shows that the conveying section 13A in the operative position of the outlet device 10 preferably extends slightly lower relative to the upper face 3' of the die plate 3.

For the person skilled in the art, numerous modifications which are intended to fall within the protected scope of the accompanying claims are disclosed from the above description. The invention is not limited to the exemplary embodiment shown. Since the outlet device according to the invention is able to be used advantageously for different pressed article formats, an adaptation to different die plates, tablet presses and pressed article formats, in particular by the use of other deflection plates, other guide plates and other deflector rails may be implemented by a different curvature of the wall with short conversion times. The conveyor belt may also guide the pressed articles away obliquely upwardly or downwardly from the die plate.

Moreover, while considerable emphasis has been placed on the preferred embodiments of the invention illustrated and described herein, it will be appreciated that other embodiments, and equivalences thereof, can be made and that many changes can be made in the preferred embodiments without departing from the principles of the invention. Furthermore, the embodiments described above can be combined to form yet other embodiments of the invention of this application. Accordingly, it is to be distinctly understood that the foregoing descriptive matter is to be interpreted merely as illustrative of the invention and not as a limitation.

The invention claimed is:

1. An outlet device for large-format pressed articles of a rotary tablet press having a rotor which is drivable in a rotational manner, a die plate and a deflector device for deflecting the pressed articles away from the die plate of the tablet press to the outlet device by the said deflector device, wherein the outlet device comprises a conveyor belt for taking over and transporting the large-format pressed articles deflected by the deflector device, wherein the large-format pressed articles have a diameter or edge length of more than 15 mm, the conveying speed of the conveyor belt is adjustable according to the rotational speed of the rotor, wherein the deflector device comprises a deflector rail with a curved guide wall partially protruding radially over the circumference of the die plate, and partially protruding over the conveyor belt of the outlet device for delaying movement of the large-format pressed articles in the operation region of the deflector rail and guiding the large-format pressed articles parallel to the running direction of the conveyor belt, wherein the conveyor belt is provided with recesses for the through-passage of air, wherein at least one suction chamber is provided between a front belt deflection roller and a rear belt deflection roller for the conveyor belt, and wherein a guide top rail is arranged at a distance above the conveying section of the conveyor belt, said guide top rail extending at least partially above the front belt deflection roller.

2. The outlet device according to claim 1, wherein the conveying speed of the conveyor belt is more rapid than the production speed of pressed articles, which is dependent on the rotational speed of the rotor, and is more rapid than the production speed by a fixed factor.

3. The outlet device according to claim 1, wherein the conveyor belt comprises a conveying section for horizontally taking over and removing of the pressed articles, deflected by the deflection device, wherein the front belt deflection roller in the operative position of the outlet device is able to be positioned adjacent to the circumference of the die plate such that the front belt deflection is able to be positioned or is positioned at least partially below the guide wall of the deflector rail of the deflector device partially radially protruding over the die plate or a rotary tablet press, wherein the horizontally extending conveying section is formed between the front belt deflection roller and the rear belt deflection roller.

4. The outlet device according to claim 1, wherein the conveyor belt is provided between an upper conveying section and a lower return section with the suction chamber which is able to be connected or is connected to a suction device.

5. The outlet device according to claim 3, wherein suction chambers separated from one another are formed between the front belt deflection roller and the rear belt deflection roller for producing separate suction zones.

6. The outlet device according to claim 3, wherein an adjustable deflector is arranged between the front belt deflection roller and the rear belt deflection roller, wherein a suction zone is not formed in the operative region of the deflector.

7. The outlet device according to claim 3, wherein a separating device for sample pressed articles is arranged between the front belt deflection roller and the rear belt deflection roller, wherein a blower unit with a compressed air nozzle is arranged at the side adjacent to the conveying section, and an outlet channel for sample pressed articles, formed by a chute plate, is arranged on the opposing side of the conveying section.

8. The outlet device according to claim 6, wherein a light barrier is arranged between the deflector and the blower unit, wherein the blower unit is actuated by being coupled chronologically to a detection signal of the light barrier.

9. The outlet device according to claim 1, wherein the outlet device further includes a guide plate and the guide plate protrudes on the front face over the conveyor belt, said guide plate in the operative position together with the deflector device forming a forced guidance for the pressed articles deflected on the deflector device.

10. The outlet device according to claim 1, wherein the outlet device is positioned on a frame and the height of the position of the conveyor belt is able to be set by adjustable feet of the frame and/or by a lifting device.

11. A rotary tablet press comprising the outlet device of claim 1, the rotary tablet press further having a rotor being driveable in a rotational manner and comprising a die plate having die bores for producing pressed articles by means of press punch pairs in the die bores, with a deflector device for deflecting the pressed articles, which are produced in the die bores and located on an upper face of the die plate in the production process, to the outlet device for the pressed articles, and with a control device for controlling the rotational speed of the rotor, wherein the conveying speed of the conveyor belt is adjustable or adjusted by means of the control device according to the speed of the rotor, and wherein the deflector device comprises a deflector rail with a curved guide wall partially protruding radially over the circumference of the die plate, and partially protruding over the conveyor belt of the outlet device for delaying movement of the pressed articles in the operation region of the deflector wall and guiding the pressed articles parallel to the running direction of the conveyor belt.

12. The rotary tablet press according to claim 11, wherein the conveying speed of the conveyor belt is more rapid than the production speed of pressed articles, which is dependent on the rotational speed of the rotor, and is more rapid than the production speed by a fixed factor.

13. The rotary tablet press according to claim 11, wherein the outlet device comprises for the conveyor belt at least one front deflection roller and one rear deflection roller, wherein the front deflection roller in the operative position of the outlet device is able to be positioned adjacent to the circumference of the die plate, and is able to be positioned such that it is able to be positioned or is positioned at least partially below a guide wall of a deflector rail of the deflector device partially radially protruding over the die plate.

14. The rotary tablet press according to claim 13, wherein the upper conveying section of the conveyor belt on the front deflection roller extends lower relative to the upper face of the die plate, and/or in that a fall protection plate is mounted on the outlet device, said fall protection plate extending at least partially in the gap between the front deflection roller and the circumference of the die plate, and extending lower relative to the upper face of the die plate, wherein the fall protection plate on the front face facing the circumference of the die plate has a front edge extending in an oblique or curved manner.

15. The rotary tablet press according to claim 13, wherein suction chambers separated from one another are formed between the front deflection roller and the rear deflection roller for producing separate suction zones, wherein the suction zone arranged closer to the front deflection roller is assigned an air blade, the air outlet direction thereof being oriented obliquely and counter to the direction of conveyance of the conveyor belt, and/or wherein a tunnel portion for the conveying section of the conveyor belt is formed above each suction chamber by means of a cover.

16. The rotary tablet press according to claim 13, wherein a separating device for sample pressed articles is arranged between the front deflection roller and the rear deflection roller, wherein a blower unit with a compressed air nozzle is arranged at the side adjacent to the conveying section, and an outlet channel for sample pressed articles, formed by a chute plate, is arranged on the opposing side of the conveying section.

17. The rotary tablet press according to claim 11, wherein a guide plate protrudes on the front face over the conveyor belt, said guide plate in the operative position together with the deflector device forming a forced guidance for the pressed articles deflected on the deflector device.

18. The rotary tablet press according to claim 17, wherein an outlet channel for faulty pressed articles, formed by an outlet chute, extends at least partially parallel to the conveyor belt, wherein the outlet channel for faulty pressed articles has an inlet opening, the guide plate being formed or starting at the end thereof, viewed in the rotational direction of the die plate.

19. The outlet device according to claim 5, wherein the suction zone arranged closer to the front belt deflection roller is assigned an air blade, the air outlet direction thereof being oriented obliquely and counter to the direction of conveyance of the conveyor belt, and/or wherein a tunnel portion for the conveying section of the conveyor belt is formed above each suction chamber by means of a cover.

* * * * *